US012344516B2

(12) United States Patent
Mainz et al.

(10) Patent No.: US 12,344,516 B2
(45) Date of Patent: Jul. 1, 2025

(54) DRIVERLESS TRANSPORT VEHICLE HAVING A PAYLOAD LIFTING APPARATUS

(71) Applicant: Continental Automotive Technologies GmbH, Hannover (DE)

(72) Inventors: Sven Mainz, Hofheim am Taunus (DE); Sascha Gerber, Bad Schwalbach (DE)

(73) Assignee: Continental Automotive Technologies GmbH, Hannover (DE)

( * ) Notice: Subject to any disclaimer, the term of this patent is extended or adjusted under 35 U.S.C. 154(b) by 320 days.

(21) Appl. No.: 17/999,390

(22) PCT Filed: May 10, 2021

(86) PCT No.: PCT/DE2021/200062
§ 371 (c)(1),
(2) Date: Nov. 18, 2022

(87) PCT Pub. No.: WO2021/233505
PCT Pub. Date: Nov. 25, 2021

(65) Prior Publication Data

US 2023/0202813 A1 Jun. 29, 2023

(30) Foreign Application Priority Data

May 19, 2020 (DE) ..................... 10 2020 206 306.0

(51) Int. Cl.
*B66F 9/06* (2006.01)
*B66F 9/065* (2006.01)

(52) U.S. Cl.
CPC .............. *B66F 9/063* (2013.01); *B66F 9/065* (2013.01)

(58) Field of Classification Search
CPC ............. B66F 9/06; B66F 9/063; B66F 9/065
See application file for complete search history.

(56) References Cited

U.S. PATENT DOCUMENTS

| | | | |
|---|---|---|---|
| 4,925,357 | A | 5/1990 | Cisternino |
| 4,998,858 | A | 3/1991 | Magens |
| 5,388,657 | A | 2/1995 | Shiraishi |
| 5,967,728 | A | 10/1999 | Gales |
| 2005/0191160 | A1 | 9/2005 | Melin et al. |
| 2016/0167557 | A1 | 6/2016 | Mecklinger |

(Continued)

FOREIGN PATENT DOCUMENTS

| | | | |
|---|---|---|---|
| CN | 102730358 | A | 10/2012 |
| CN | 208666169 | U | 3/2019 |

(Continued)

OTHER PUBLICATIONS

Notice of Reasons for Refusal drafted Sep. 6, 2023 for the counterpart Japanese Patent Application No. 2022-562743 and translation of same.

(Continued)

*Primary Examiner* — Kaitlin S Joerger

(57) ABSTRACT

A driverless automatically guided transport vehicle for conveying payloads for example a material transport vehicle in a factory. The transport vehicle comprises a payload lifting apparatus which is configured to lift the load such that said load can be transported in the lifted state and an eccentric drive to perform a lifting operation of the lifting apparatus.

9 Claims, 3 Drawing Sheets a)

b)

(56) References Cited

U.S. PATENT DOCUMENTS

| | | | | |
|---|---|---|---|---|
| 2018/0170468 | A1 | 6/2018 | Berghammer | |
| 2022/0371424 | A1* | 11/2022 | Nagel | G05D 1/0291 |
| 2022/0380187 | A1* | 12/2022 | Nagel | B25J 5/007 |
| 2023/0192461 | A1* | 6/2023 | Mainz | B66F 9/07513 254/2 C |

FOREIGN PATENT DOCUMENTS

| | | | | |
|---|---|---|---|---|
| CN | 110482442 | A | 11/2019 | |
| DE | 156980 | C | 4/1969 | |
| DE | 3213983 | A1 | 10/1983 | |
| DE | 3545298 | A1 | 7/1987 | |
| DE | 60316976 | T2 | 7/2008 | |
| DE | 102013013274 | A1 | 2/2015 | |
| DE | 102013013438 | A1 | 2/2015 | |
| DE | 202015104465 | U1 | 10/2015 | |
| DE | 102020104808 | A1 * | 7/2021 | |
| EP | 0102706 | A1 | 3/1984 | |
| EP | 3845482 | A1 * | 7/2021 | B66F 9/063 |
| JP | H08207754 | A | 8/1996 | |
| JP | 2004075344 | A | 3/2004 | |
| WO | 2014118716 | A2 | 8/2014 | |
| WO | WO-2023116986 | A1 * | 6/2023 | B66F 9/063 |

OTHER PUBLICATIONS

German Search Report dated Apr. 26, 2021 for the counterpart German Patent Application No. 10 2020 206 306.0.

The International Search Report and the Written Opinion of the International Searching Authority mailed on Aug. 5, 2021 for the counterpart PCT Application No. PCT/DE2021/200062.

First Office Action dated Aug. 19, 2024 for the counterpart Chinese Patent Application No. 202180030632.0 and machine translation of same.

* cited by examiner a)
b)
c)

a)
b)
c)

b)

a)

DRIVERLESS TRANSPORT VEHICLE HAVING A PAYLOAD LIFTING APPARATUS

CROSS-REFERENCE TO RELATED APPLICATIONS

The present application is a National Stage Application under 35 U.S.C. § 371 of International Patent Application No. PCT/DE2021/200062 filed on May 10, 2021, and claims priority from German Patent Application No. 10 2020 206 306.0 filed on May 19, 2020, in the German Patent and Trademark Office, the disclosures of which are herein incorporated by reference in their entireties.

TECHNICAL FIELD

The invention relates to a driverless, transport vehicle for conveying payloads.

BACKGROUND

Transport vehicles are normally used as so-called industrial trucks or material transport vehicles in production factories, for example for transporting particular payloads in the warehouse or from the warehouse to the production line. In the case of such transport vehicles, the load may be composed both directly of the payload itself and of a payload carrier that can be separately loaded with the payload—for example a rack, a roller trolley or the like. Here, it is the intention that the transport vehicle can travel under such a payload carrier, independently lift said payload carrier, transport said payload carrier to the destination, and set said payload carrier down again there. For this purpose, the transport vehicle is equipped with an integrated lifting apparatus.

Various solutions for implementing the lifting function are known from practice. In order to be able to quickly and precisely lift large loads, the lifting apparatus requires high stiffness and a high-powered motor configuration, with a correspondingly high demand for electrical energy, which consequently entails higher weights, larger batteries, higher costs or shorter traveling ranges.

DE 102013013438 A1 has disclosed, for example, a transport vehicle, the lifting function of which is implemented by way of various thrust and lever apparatuses which, owing to their design principle and stiffness requirements, exhibit a high system weight and have a large structural space requirement.

EP 102706 A1 has disclosed a further transport vehicle, the lifting apparatus of which is constructed with ball screw drives, which are complex to produce and are relatively expensive.

SUMMARY

The lifting operation is implemented by way of an eccentric drive. A simple, inexpensive, robust and low-maintenance solution for lifting and holding large loads can be realized in this way.

In order to realize a construction of the transport vehicle which is compact and favorable in terms of maintenance, said transport vehicle has a flat chassis with drive components arranged therein, and has at least one load carrier element which is height-adjustable relative to the chassis and which serves for carrying the payload. Here, the eccentric drive has at least one rotatably mounted eccentric element which, during the lifting operation, introduces a lifting force into the load carrier element. In this way, the lift travel can be structurally defined through the configuration of the eccentric element and malfunctions and failures are avoided.

According to one refinement, for reliable lift synchronization, the lifting apparatus comprises a lifting shaft which extends in a transverse direction substantially through the entire chassis and which has in each case one eccentric element at opposite ends. Furthermore, the lifting operation can thus be implemented by way of a single drive unit that acts on the lifting shaft.

According to one embodiment, for the purposes of a robust transmission of force from the drive unit to the lifting shaft, with simultaneously particularly flexible and effective utilization of structural space, the lifting shaft is actuated by means of a wraparound drive.

For efficient guidance and support of the load carrier element, at least one peripheral portion of an aperture, which is configured for the lifting shaft to extend through it, in the load carrier element is provided for the guidance of the load carrier element in a lifting direction and for support transversely with respect to the lifting direction.

According to a further refinement, for further guidance and support of the load carrier element, this has, at an end side, a planar surface portion which is formed parallel to the lifting direction and which bears in a longitudinal direction against a corresponding region of the chassis and slides thereon.

According to a preferred, for a stable and at the same time weight-saving construction, the transport vehicle has two load carrier elements, which are arranged in each case oppositely on both sides of the chassis.

In order to increase stiffness or enhance the functional scope, the two load carrier elements may be connected to one another by means of at least one transverse connection.

For robust synchronization of the lifting apparatus in a longitudinal direction, one embodiment provides that the lifting apparatus has at least two eccentric elements, which act on the same load carrier element and which are coupled to one another by means of a wraparound drive.

According to another embodiment, the eccentric element has a rolling bearing element which is arranged radially at the outside and which rolls on the load carrier element during the lifting operation. The eccentric element and its counterbearing thus do not need to be hardened in order to reduce wear. It is likewise possible to dispense with maintenance-intensive lubricants, which are susceptible to contamination, or sliding coatings, which are susceptible to wear. Furthermore, the drive motor does not need to overcome any great friction resistance between the eccentric element and its counterbearing in addition to the load. The power of the drive unit can be reduced in favor of a smaller structural space and lower energy consumption, or larger loads can be lifted and transported.

According to another embodiment, the lifting apparatus may comprise four eccentric elements which are coupled to one another and which are forcibly movable simultaneously and which serve for lifting and lowering the load.

Disruption-free and uniform lifting and lowering of the load can thus be realized purely mechanically and without separate outlay on control technology.

BRIEF DESCRIPTION OF THE DRAWINGS

The present invention will be discussed in more detail below on the basis of an exemplary embodiment. In the figures.

DETAILED DESCRIPTION

Figure 1:
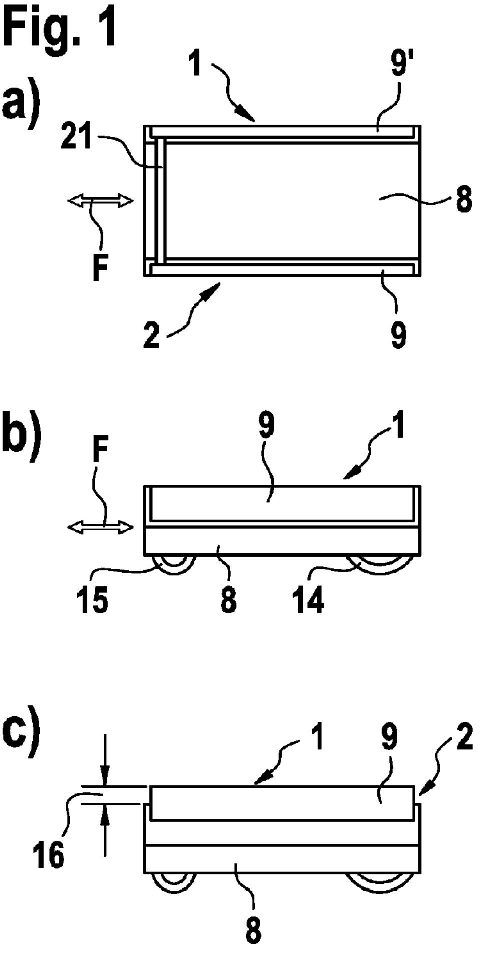
FIG. 1 is a simplified illustration of the transport vehicle in a plan view (view a) and side views with a retracted (b) and deployed (c) lifting apparatus.

The driverless transport vehicle 1 serves for conveying payloads on smooth floors in production and assembly factories, for example for the purposes of transporting parts and components from and to the production line or in the parts warehouse. The transport vehicle 1 selects its traveling route autonomously on the basis of integrated space monitoring sensors and a control system, which are however not accentuated here and are not illustrated.

The transport vehicle 1 has a flat, compact chassis 8, in and on which all control and drive components are arranged.

In the embodiment shown, the transport vehicle 1 moves on a pair of support wheels 15 and a pair of drive wheels 14. The drive wheels 14 are driveable individually, independently of one another, and thus serve both for the propulsion and for the steering of the transport vehicle 1.

For carrying the load or for the placement of the load, the transport vehicle 1 has two load carrier elements 9, 9', which form a constituent part of a lifting apparatus 2. The load carrier elements 9, 9' are of elongate form in a longitudinal direction or parallel to the direction of travel F and laterally flank the chassis 8 in the upper region. In the embodiment shown, each load carrier element 9, 9' is configured as a box-like hollow body. To lift the load, the load carrier elements 9, 9' can be lifted in a vertical lifting direction H by a lift travel 16 from a retracted parked position (view b) into a deployed transport position.

Load carrier elements 9, 9' may be cross-connected (21) by way of one or more struts, strips or panels (not shown here) in order, for example, to increase the stiffness and/or in order to realize a larger flat loading surface.

Figure 2:
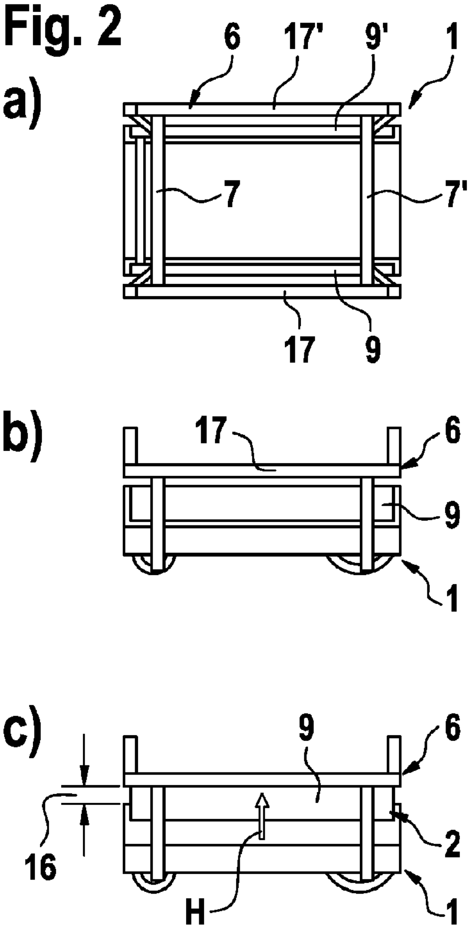
FIG. 2 shows views as per FIG. 1, but additionally with a payload carrier.

In FIG. 2, the transport vehicle 1 is designed for transporting payloads in a separate payload carrier 6. The payload carrier 6 may be constructed in a variety of forms—in the form of a rack as shown, in the form of a trolley or roller trolley, or the like.

The payload carrier 6 is constructed such that the transport vehicle 1 with the load carrier elements 9, 9' in the parked position can travel under the payload carrier 6. The payload carrier 6 has two traverses 7, 7' which run transversely with respect to the direction of travel and on which the load carrier elements are supported during the lifting and transporting of the payload carrier 6. In the embodiment shown, the traverses 7, 7' are connected by way of two externally situated longitudinal members 17, 17'.

To transport the load, the transport vehicle 1 travels under the payload carrier 6 and activates the lifting apparatus 2. Here, the load carrier elements 9, 9' are lifted in the lifting direction H, abut against the traverses 7, 7', and lift the payload carrier 6 from the floor. The payload carrier 6 can thereupon be transported to the destination, and set down on the floor again there in the reverse sequence.

Figure 3:
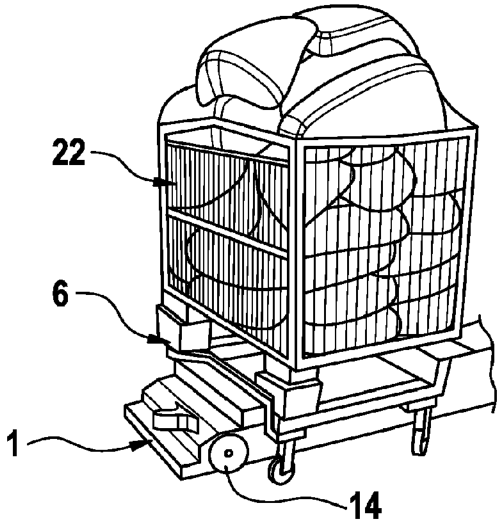
FIG. 3 is an exemplary illustration of an embodiment of the transport vehicle with a payload in a payload carrier.

FIG. 3 shows an exemplary usage scenario of the transport vehicle 1 and corresponds substantially to the situation illustrated in FIG. 2*b*. An embodiment of the transport vehicle 1 is situated under a payload carrier 6, which is configured as a roller trolley. The payload carrier 6 is laden with a payload 22, which is composed of a wire-mesh box filled with sacks.

Figure 4:
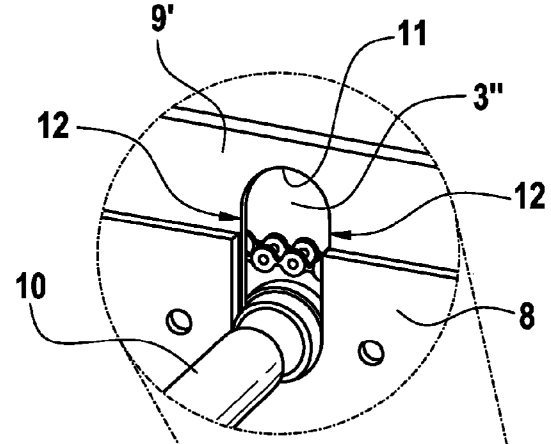
FIG. 4 is a three-dimensional illustration of some elements of the chassis and of the lifting apparatus (a) and an enlarged illustration of the guidance in the aperture of the load carrier element (b).
Figure 4:
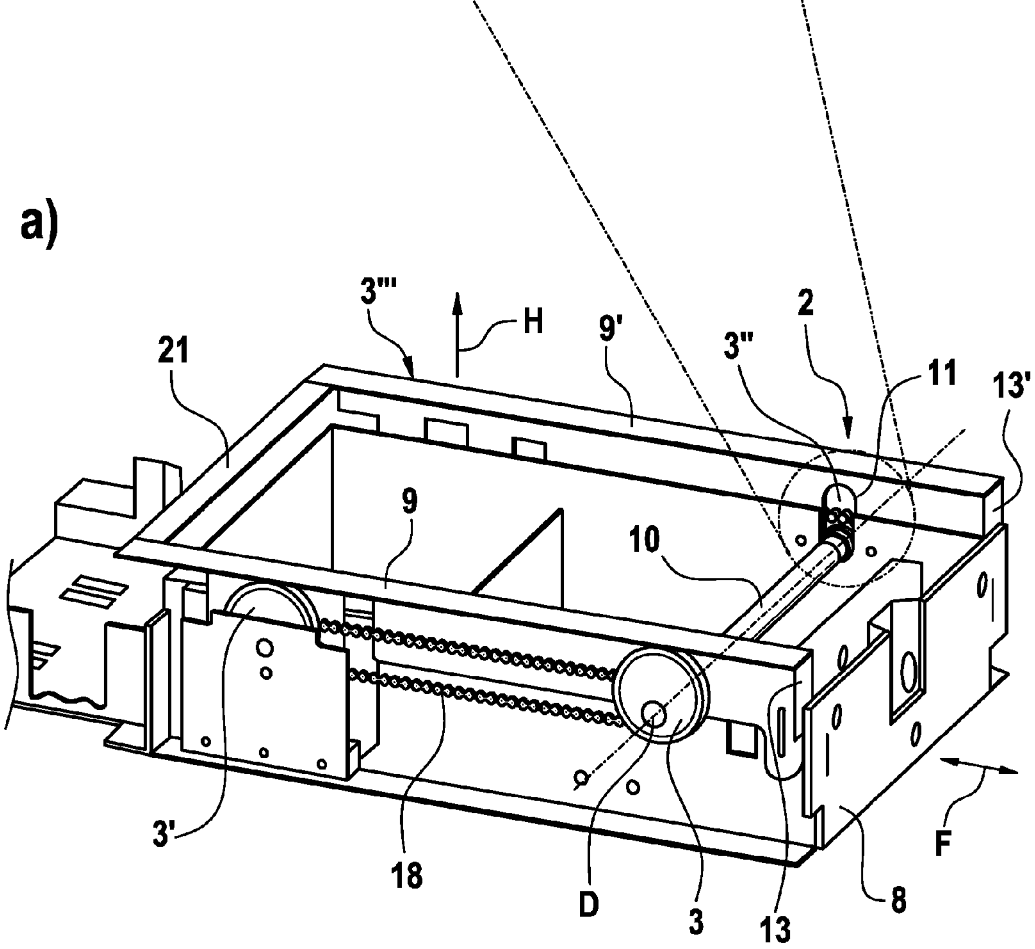

FIG. 4 shows some structural elements of the chassis 8 with components of the lifting apparatus 2.

The lifting apparatus 2 has a lifting shaft 10 which is rotatable about the axis of rotation D and which extends in a transverse direction substantially through the entire chassis 8 and which, in so doing, engages with its ends into the two opposite load carrier elements 9, 9'. In each case one disk-shaped eccentric element 3, 3" is arranged, so as to be fixed in rotationally conjoint fashion, on the ends of the lifting shaft 10. Overall, the lifting apparatus 2 has four disk-shaped eccentric elements 3, 3', 3", 3'" that support the load carrier elements 9, 9' in a vertical direction.

Each load carrier element 9, 9' has an aperture 11 for the lifting shaft to engage through. Each aperture is of elongate form in a vertical direction and has two straight peripheral portions 12 that are oriented parallel to the lifting direction H and to one another. By means of these two peripheral portions 12, forces acting for example in parallel to the direction of travel F, or transversely with respect to the lifting direction H, are introduced from the load carrier element 9 into the lifting shaft 10 and thus the chassis 8. In this way, the peripheral portions 12 serve for guidance and for support of forces for the load carrier elements 9, 9'.

Furthermore, each load carrier element 9, 9' has, at an end side, a planar surface portion 13, 13' which is formed parallel to the lifting direction H. These surface portions 13, 13' likewise serve as a vertical guide during the lifting operation and for the support and introduction of longitudinal forces into the chassis 8.

Figure 5:
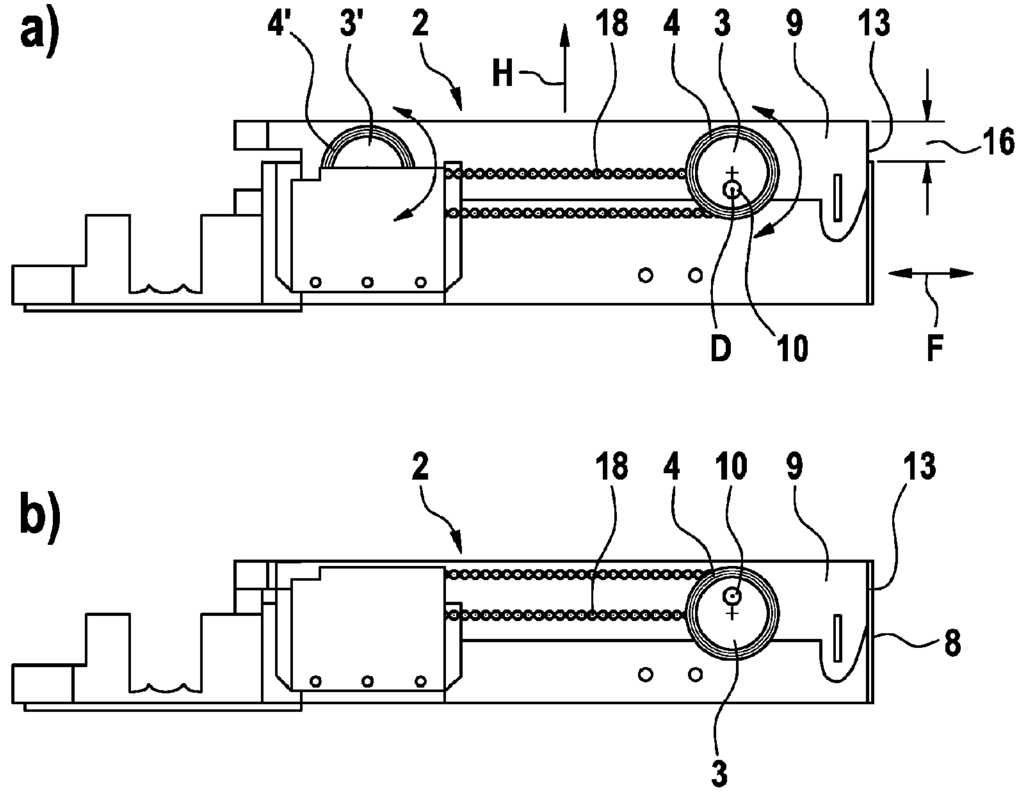
FIG. 5 shows a partial side view of some elements of the transport vehicle 1 and of the lifting apparatus 2 in the lifted transport position (a) and in the lowered parked position (b).

FIG. 5 shows a partial side view of some elements of the transport vehicle 1 and of the lifting apparatus 2, with a side wall of the load carrier element 9 having been removed, in the lifted transport position (view a) and in the lowered parked position (view b).

On each side of the transport vehicle 1, the lifting apparatus (2) has in each case two eccentric elements (3, 3') of equal size, which act on the same load carrier element (9). Here, the drive-side eccentric element 3, which is seated on the lifting shaft 10, is coupled to the other, output-side eccentric element 3' by means of a wraparound drive 18, such that, when the lifting shaft 10 rotates, both eccentric elements 3, 3' rotate simultaneously in the same direction. In the above embodiment, the wraparound drive 18 is implemented as a chain drive. Further embodiments, for example in the form of a toothed-belt drive, however likewise remain admissible.

In order to perform a lifting movement, the rotational movement of the lifting shaft 10 is converted by the eccentric element 3, 3' into a translational movement of the load carrier element 9 parallel to the lifting direction H. The upper horizontal rail of the load carrier element 9 serves here as a counterbearing for the eccentric elements 3, 3'. In order to reduce friction between the eccentric elements 3, 3' and the load carrier element 9, each eccentric element 3, 3' is equipped, radially at the outside, with a rolling bearing element 4, by means of which said eccentric element rolls quietly and with low friction on its counterbearing. By means of the peripheral portions 12 of the aperture 11, as have already been mentioned above, and the surface portion 13, the force components directed transversely with respect to the lifting direction H that arise as the eccentric elements 3, 3' roll on the load carrier element 9 are introduced into the chassis 8.

Figure 6:
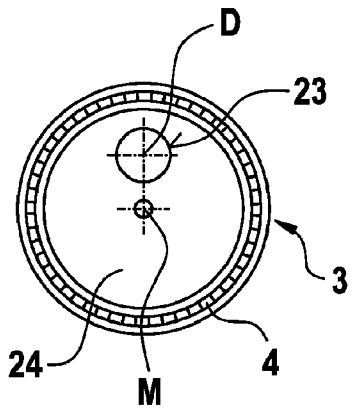
FIG. 6 shows an embodiment of an eccentric element with a rolling bearing element.

FIG. 6 shows an embodiment of the eccentric element 3. A rolling bearing element 4 is situated at the radial outer edge of an eccentric disk 24. In the embodiment shown, the rolling bearing element 4 is configured as a ball bearing that has been pressed onto the eccentric disk 24. It is however equally conceivable for the eccentric disk 24 itself to be configured as a constituent part, for example the inner ring, of a rolling bearing.

The lift travel 16 of the lifting apparatus 2 is structurally defined as double the radial distance between the center point M of the eccentric disk 24 and the axis of rotation D in the centre of the lifting shaft receptacle 23.

Figure 7:
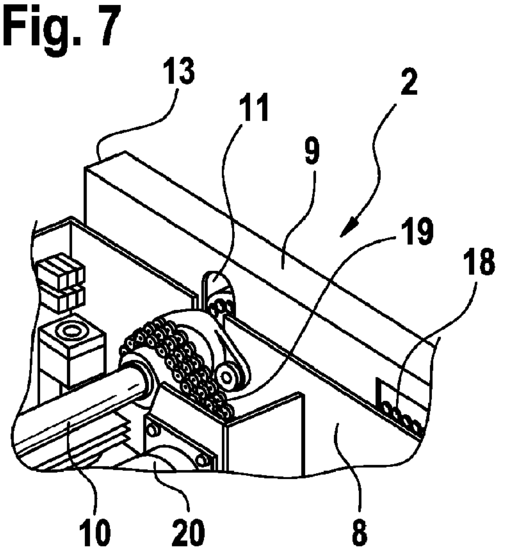
FIG. 7 shows a detail view of the drive of the lifting shaft.

FIG. 7 shows an embodiment of the actuation of the lifting shaft 10 by means of a wraparound drive 19, which is activated by an electromotive drive unit 20. The drive unit 20 thus functions as a lifting drive of the lifting apparatus 2.

In the embodiment shown, the wraparound drive 19 is provided as a chain drive. Within the invention, this may however be of some other configuration, for example in the form of a belt drive, depending on requirements.

The invention claimed is:

1. A driverless automatically guided transport vehicle for transporting a load comprising:

a lifting apparatus which is configured to lift the load such that said load can be transported in the lifted state;

a lifting shaft of the lifting apparatus, which extends in a transverse direction and having at least one rotatably mounted eccentric element at each opposing end;

at least one load carrier element of the lifting apparatus which is height-adjustable relative to a chassis of the vehicle, and which serves for carrying the payload, wherein the at least one load carrier element defines at least one aperture through which the lifting shaft extends;

an eccentric drive to implement a lifting operation of the lifting apparatus; wherein the at least one rotatably mounted eccentric element introduces a lifting force into the load carrier element during the lifting operation; and at least one straight peripheral portion of the aperture extending in a lifting direction configured for guidance of the load carrier element in the lifting direction and for support transversely with respect to the lifting direction on the lifting shaft.

2. The transport vehicle as claimed in claim 1, wherein the chassis has drive components arranged therein.

3. The transport vehicle as claimed in claim 1, wherein the lifting shaft is actuated by a wraparound drive.

4. The transport vehicle as claimed in claim 1, wherein the load carrier element has, at an end side, a planar surface portion which is formed parallel to the lifting direction and which is provided for support and introduction of force into the chassis in a longitudinal direction.

5. The transport vehicle as claimed in claim 1, wherein the transport vehicle has two load carrier elements, which are arranged in each case oppositely on both sides of the chassis.

6. The transport vehicle as claimed in claim 5, wherein the two load carrier elements are connected to one another by at least one transverse connection.

7. The transport vehicle as claimed claim 1, wherein the lifting apparatus has at least two eccentric elements, which act on the same load carrier element and which are coupled to one another by a wraparound drive.

8. The transport vehicle as claimed in claim 1, wherein the eccentric element has a rolling bearing element which is arranged radially at the outside and which rolls on the load carrier element during the lifting operation.

9. The transport vehicle as claimed in claim 1, wherein the lifting apparatus comprises four eccentric elements which are coupled to one another and which are forcibly movable simultaneously and which serve for lifting and lowering the load.

* * * * *